United States Patent [19]

Kohnke et al.

[11] Patent Number: 5,215,469
[45] Date of Patent: Jun. 1, 1993

[54] TRAINING APPARATUS FOR THE PRACTICE OF PUNCTURING BLOOD VESSELS

[75] Inventors: Ole B. Køhnke, Lyngby; Lasse Petersen, Espergaerde, both of Denmark

[73] Assignee: Ambu International A/S, Glostrup, Denmark

[21] Appl. No.: 832,338

[22] Filed: Feb. 7, 1992

[30] Foreign Application Priority Data

Feb. 13, 1991 [DK] Denmark ............... 0247/91

[51] Int. Cl.⁵ ............................................. G09B 23/28
[52] U.S. Cl. ...................................... 434/268; 434/272
[58] Field of Search ............... 434/272, 268, 267, 262

[56] References Cited

U.S. PATENT DOCUMENTS

| | | | |
|---|---|---|---|
| 2,686,374 | 8/1954 | Niiranen | 434/267 |
| 2,689,415 | 9/1954 | Haver | 434/272 |
| 2,871,579 | 2/1959 | Niiranen et al. | 434/268 |
| 2,995,832 | 8/1961 | Alderson | 434/272 X |
| 3,154,881 | 11/1964 | Elwell | 434/272 X |
| 3,789,518 | 2/1974 | Chase | 434/272 |
| 3,852,893 | 12/1974 | Smrcka | 434/268 |
| 4,182,054 | 1/1980 | Wise et al. | 434/268 |

*Primary Examiner*—John J. Wilson
*Assistant Examiner*—Jeffrey A. Smith
*Attorney, Agent, or Firm*—Watson, Cole, Grindle & Watson

[57] ABSTRACT

A training apparatus (10) for the practice of puncturing blood vessels includes a model arm and an air-tight, liquid-tight compressible liquid container (19) and a two-way pressure threshold valve for transferring liquid between the container and the model arm. The model arm includes a core (14) of a solid material, a tight-fitting cover (32) of a penetrable material and at least one penetrable tube (31) provided between the core (14) and the cover (32), one end of the tube being connected to the liquid container (19) and the other end being sealed. The liquid container (19) is integrated into the model arm and disposed in such a manner so as to allow it to be compressed by establishing a pressure on a part of the surface of the model arm.

5 Claims, 2 Drawing Sheets

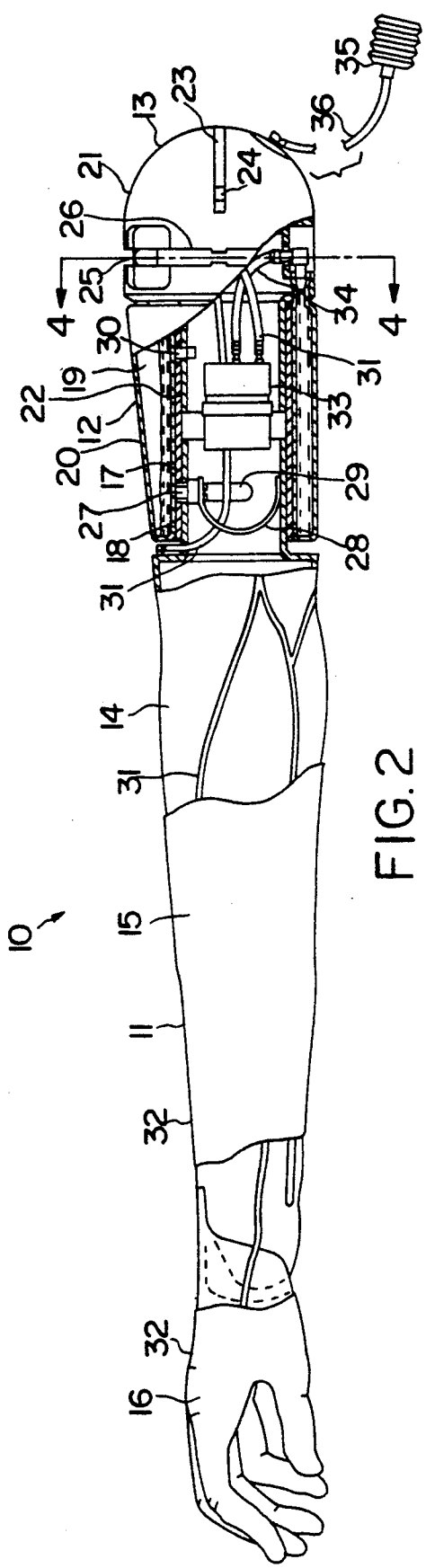
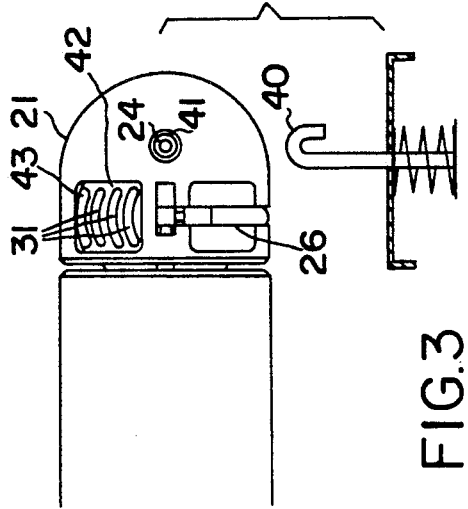
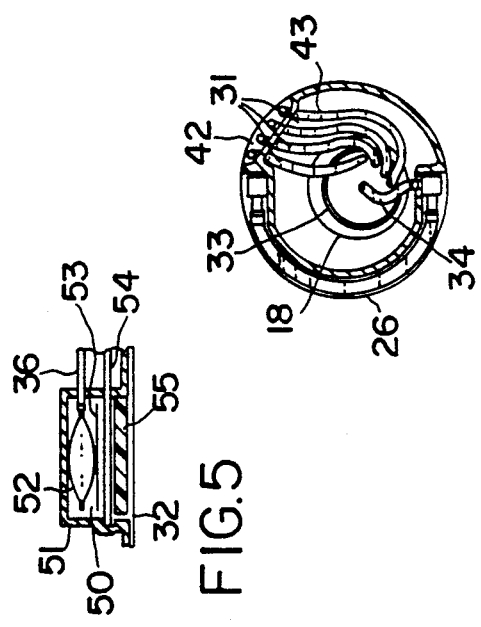
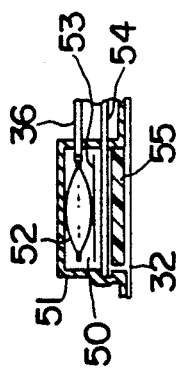
FIG.2
FIG.3
FIG.4
FIG.5

1

TRAINING APPARATUS FOR THE PRACTICE OF PUNCTURING BLOOD VESSELS

BACKGROUND OF THE INVENTION

The present invention relates to a training apparatus for the practice of puncturing blood vessels, said apparatus comprising a model arm and an air-tight, liquid-tight compressible liquid container and means for transferring liquid between the container and the model arm, which model arm comprises a core of a solid material, a tight-fitting cover of a penetrable material and at least one penetrable tube provided between the core and the cover, one end of the tube being connected to the liquid container and the other end being sealed.

Training apparatus of the above-mentioned type are used for the practice of performing injections, blood samplings, infusions, etc., the tubes of the model arm being used for simulating human blood vessels and the cover being used for simulating skin tissue.

A prior art training apparatus of the type mentioned above comprises a rigid liquid container for placing at a level above the model arm and which communicates with the ambient atmosphere, which container at its lower end includes an outlet to which a plastic tube forming a liquid connection with the tubes of the model arm is connected.

Prior to use the liquid container is filled with liquid and the tubes of the model arm are filled with liquid by evacuating the tubes of air, thereby causing the tubes to be filled with liquid by means of gravitational force. The liquid container is placed at such a distance above the model arm that a suitable pressure is provided in the tubes to simulate the protrusion of veins, which is necessary to allow insertion of a syringe and which in real life is established by constriction of the upper arm to prevent return flow from the veins of the arm.

In the prior art training apparatus the liquid container functions as a reservoir which is capable of both discharging and absorbing liquid. When liquid is discharged from the tubes, liquid will flow from the liquid container and into the tubes, thereby ensuring that the tubes are always filled. Vice versa, the liquid container will be able to absorb liquid in connection with, e.g., infusion provided the infusion pressure exceeds the pressure in the tubes.

In another prior art training apparatus a closable, collapsible liquid container is used instead of the rigid open liquid container.

SUMMARY OF THE INVENTION

The object of the present invention is to provide a training apparatus of the type mentioned above which is easier to operate and easier to handle than the prior art training apparatus and by means of which a more realistic practice can be obtained.

This object is obtained with the training apparatus according to the invention, which training apparatus is characterized in that the liquid container is integrated into the model arm and disposed in such a manner so as to allow it to be compressed by establishing a pressure on a part of the surface of the model arm.

The invention is based on the discovery that the liquid pressure which is necessary to obtain protruding tubes and the feature that the liquid container can both discharge and absorb liquid can be provided with a partially liquid-filled compressible container and by establishing a pressure thereon.

In practice, when, e.g., catheters are inserted in connection with infusions, the upper arm is constricted prior to the insertion of the catheter in order to make the veins of the lower arm and the hand stand out and to prevent return flow of blood in the veins of the arm.

The training apparatus according to the invention provides a possibility of performning the compression of the liquid container by means of a blood pressure cuff or a belt, thereby making it possible to simulate the treatment procedure quite realistically, notwithstanding the fact that the model arm is constricted for another purpose than in reality.

In using the training apparatus according to the invention a certain pressure is established on the compressible part of the wall of the liquid container before use, thereby at the same time establishing a liquid pressure in the tubes due to the fact that the system is a closed system.

Thus, the training apparatus of the invention makes it possible in a simple manner to make the tubes stand out.

When liquid is discharged from the tubes, which, e.g., occurs when taking liquid samples and in connection with insertion of catheters, liquid will, as a result of the overpressure in the liquid container, flow from the container and into the tubes, thereby maintaining the tubes liquid-filled.

Vice versa, when liquid is supplied to the tubes, the liquid container, which as mentioned above preferably is only partly filled with liquid and thus comprises a certain free volume, will be able to absorb liquid which is supplied to the tubes under pressure.

According to a preferred embodiment of the invention the liquid transfer means comprises a two-way pressure threshold valve.

The pressure threshold valve will open when a certain overpressure exists either in the liquid container or in the tubes, and as a result liquid will flow either from the liquid container or to the liquid container.

The pressure threshold valve serves to prevent liquid from flowing out of the tubes and into the liquid container in situations where no pressure is established on the liquid container and where the tubes are elevated in relation to the liquid container, which, e.g., may occur during transport of the training apparatus.

The model arm according to the invention may comprise both a hand portion and an arm portion.

A preferred embodiment of the invention is characterized in that the hand portion can be bent in relation to the arm portion.

In practice, when puncturing the veins of the back of the hand the hand is ordinarily bent in relation to the lower arm in order to make the veins stand out and to make the skin taut.

The above-mentioned preferred embodiment of the invention provides a possibility of performing such a hand bending.

A further preferred embodiment of the invention is characterized in that the model arm is constructed of two parts which are combined in a manner which allows them to revolve completely or partially in relation to each other around the longitudinal axis of the model arm.

The noted preferred embodiment of the invention provides a possibility of simulating the rotational property of a human arm.

The core of the model arm preferably has the form of a hollow body on the outside of which a number of recessed, longitudinal grooves is formed in which the tubes can be completely or partly embedded.

The core may, e.g., consist of polyvinyl chloride (PVC).

The tubes and the cover may consist of rubber, preferably natural rubber.

The elastic part of the wall of the liquid container may consist of an elastomeric material, preferably soft PVC or rubber.

BRIEF DESCRIPTION OF THE DRAWINGS

The invention will be further described below with reference to the drawings, wherein FIG. 2 shows a side view and partially a longitudinal view of a preferred embodiment of a training apparatus according to the invention, FIG. 3 shows a perspective view of the proximal end of the training apparatus shown in FIG. 2 and viewed from another angle, FIG. 4 shows a cross sectional view of the proximal end of the training apparatus shown in FIG. 2 and along the line 4—4, FIG. 5 shows a longitudinal view of a section of the distal end of the training apparatus shown in FIG. 2.

DETAILED DESCRIPTION OF THE PREFERRED EMBODIMENT

Figure 1:
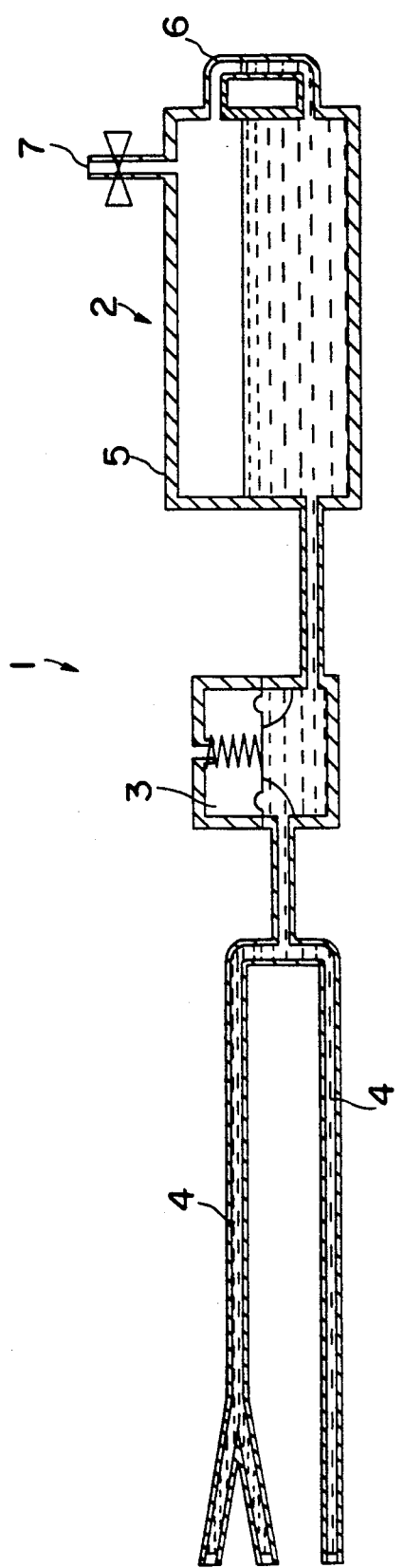
FIG. 1 shows a longitudinal view of a schematic diagram of a preferred embodiment of a training apparatus according to the invention.

FIG. 1 shows in principle a training apparatus comprising a partially filled, elongated liquid container 2 which is connected to one side of a pressure threshold valve 3, the other side of the valve being connected to a number of tubes 4.

The liquid container 2 comprises a flexible wall 5 and a liquid level indicator 6 and a liquid filling opening 7.

When used for simulating, e.g., insertion of catheters the training apparatus 1 operates in the following way:

By use of, e.g., a blood pressure cuff, a pressure of a magnitude which causes the pressure threshold valve 3 to open is initially established on the liquid container 2, thereby causing the liquid in the tubes 4 to be pressurized. Subsequently a catheter is inserted into one of the tubes 4 by use of a syringe, the syringe is then removed and the catheter is connected to a tube through which infusion liquid is supplied.

During the period between inserting the catheter and attaching the infusion tube to the catheter, liquid will flow out of the catheter as a result of the overpressure in the liquid system of the training apparatus and in order to simulate real life conditions, which liquid will be replaced with liquid from the liquid container 2.

After insertion of the catheter, the pressure deriving from the blood pressure cuff can be terminated just as it is done in reality. Infusion liquid is now supplied to the tube 4 under a pressure which is higher than the opening pressure of the pressure threshold valve 3, thereby allowing excess liquid from the tubes 4 to be discharged and collected in the liquid container 2.

FIG. 2 shows a training apparatus 10 comprising a distal portion 11, a liquid container portion 12 and a proximal portion 13.

The distal portion 11 comprises an inner solid core 14 which is composed of a hollow, lower arm portion 15, a hand portion 16 attached to the distal part of the lower arm portion 15, and a hollow, cylindrical fastening means 17 in extension of the proximal end of the lower arm portion 15. The core 14 is made of PVC.

The hand portion 16 is attached to the lower arm portion 15 in a manner which allows the former to be bent in relation to the latter so that the two rigid parts form an angle with one another.

The liquid container 12 comprises a cylindrical metal pipe 18, on the outside of which a ring liquid container 19 is mounted, the walls 20 of the container consisting of soft PVC.

The proximal portion 13 comprises a rounded shoulder portion 21, and in extension of the distal end thereof, a hollow, cylindrical fastening means 22. The shoulder portion 21 comprises a recess 23 with a pin 24 to which a hook may be fastened, and a recess 25 which extends over half of the circumference of the shoulder portion 21 and wherein a liquid level indicator 26 is mounted for measuring the liquid level in the liquid container 19 and consisting of a tube which is in liquid communication with the liquid container 19. The shoulder portion 21 and the fastening means 22 are made from PVC.

The distal portion 11 is connected to the liquid container portion 12 by means of the fastening means 17 which is located in the pipe 18 and fastened thereto with a click 27 which is maintained in position by the spring 28 and which is embedded in a groove 29 formed in the wall of the fastening means 17 and the pipe 18 and which extends over a part of the circumference thereof.

The proximal portion 13 is fastened to the pipe 18 by means of the fastening means 22 which is riveted to the pipe 18 with rivets 30.

On the outside of the hand portion 16 and the lower arm portion 15 three tubes 31 of natural rubber are located in recessed grooves, some of the tubes comprising branches. The combination of the core 14 and the tubes 31 is covered with a cover 32 of natural rubber.

At the proximal end of the lower arm portion 15 the tubes 31 are introduced into the fastening means 17 from which, through the pipe 18 and the fastening means 22, they are introduced into the shoulder portion 21 from which they are led back into the pipe 18 wherein they are connected to a pressure threshold valve 33 which is located in the interior of the pipe 18. The pressure threshold valve 33 is connected to the liquid container 19 through a tube 34.

The training apparatus 10 comprises an additional tube 54 (vide FIG. 5) which extends along the lower arm portion 15 and which terminates in a cavity 50 (see FIG. 5) formed in the core 14 at the distal end of the lower arm portion 15. This tube is connected to the liquid container 19 in the same manner as the tubes 31, i.e., through the pipe 18 and the shoulder portion 21 and via the pressure threshold valve 33.

The additional tube mentioned above serves to simulate the radial artery and the training apparatus 10 further comprises a manually operated system for the simulation of a pulse in this tube by means of an air bellows 35 connected to an air hose 36.

The principle mode of operation of the training apparatus corresponds to the mode of operation explained above with reference to FIG. 1.

The training apparatus 10 is constructed with a view to providing a training object which is as realistic as possible.

As mentioned above, the hand portion 16 also comprises tubes 31, which allows the simulation of, e.g., insertion of catheters into the veins of the back of the hand. In such an insertion of a catheter into a hand vein it is common practice to bend the hand in relation to the lower arm in order to make the veins stand out more clearly and to make the skin taut. The training apparatus 10 provides a possibility of performing such a hand bending.

The proximal portion 13 and hence the liquid container portion 12 are preferably maintained stationary by means of a hook attached to the pin 24 for the simulation of the fastening of a human arm to the body.

The construction consisting of the outer ring liquid container 19, the inner cylindrical pipe 18 and the cylindrical fastening means 17 which can be rotated around the central axis of the pipe 18 provides a possibility of pivoting the distal portion 11 in relation to the fixed liquid container portion 12 and the proximal portion 13, thereby making it possible to simulate the rotational property of a human arm. The groove 29 is formed in such a manner that the rotational potential of the distal portion 11 corresponds to that of a human arm.

FIG. 3 shows a perspective view of the proximal portion 13 of the training apparatus 10 turned 45 degrees in relation to the position of the training apparatus as shown in FIG. 2. It also shows the liquid level indicator 26 which as mentioned above extends over half of the circumference of the proximal portion 13 and a hook 40 which by insertion into the recess 23 can be brought into engagement with the pin 24 which is located in a tubular channel 41 to secure the proximal portion 13.

Furthermore FIG. 3 shows a liquid indicator 42 consisting of a small piece of each of the tubes 31 and the above mentioned additional tube 43 for the simulation of the radial artery, which pieces are located on the outside of the shoulder portion 21.

The liquid in the liquid system of the training apparatus 10 may, e.g., be coloured red to simulate blood. When e.g., infusion with a clear liquid is effected in a tube, a liquid colour change will occur in the tube in question shortly after initiation of the infusion.

Such a colour change can be observed on the liquid indicator 42 and hence it is possible to control whether the procedure for etablishing an infusion is carried out correctly.

FIG. 4 shows a cross sectional view of the proximal portion 13 along the line 4—4 in FIG. 2. FIG. 4 shows the liquid level indicator 26, the tube 34, the tubes 31, the tube 43, the pipe 18, the pressure threshold valve 33 and the liquid indicator 42.

FIG. 5 shows the above-mentioned pulse simulator system which comprises a cavity 50 in the wall 51 of the core 14 at the distal end of the lower arm portion 15. The cavity 50 contains an air container 52 which through the air hose 36 is connected to the air bellows 35 (see FIG. 2), a thin metal plate 53, a tube 54 and a piece of polyethylene foam 55. The cavity 50 is covered by a cover 32.

When the air bellows 35 is activated, the air container 52 will expand and exert a pressure on the tube 54 through the metal plate 53 for the simulation of a pulse which can be felt on the outside of the lower arm portion 15 through the foam piece 55 and the cover 32.

The tube 54 is accessible for a syringe through the cover 32 and the polyethylene foam layer 55. The metal plate 53 prevents the air container 52 from being punctured if a syringe accidentally penetrates the entire tube 54.

We claim:

1. A training apparatus for the practice of puncturing blood vessels, said apparatus comprising a model arm and an air-tight, liquid tight compressible liquid container and means for transferring liquid between the container and the model arm, which model arm comprises a core of a solid material, a tight-fitting cover of a penetrable material and at least one penetrable tube provided between the core and the cover, one end of said at lease one tube being connected to the liquid container and the other end being sealed, wherein the liquid container is integrated into the model arm and disposed in such a manner so as to allow it to be compressed by establishing a pressure on a part of the surface of the model arm.

2. A training apparatus according to claim 1, wherein the liquid transfer means comprises a two-way pressure threshold valve.

3. A training apparatus according to claim 1, wherein the model arm comprises a hand portion and an arm portion, wherein the hand portion is capable of pivoting in relation to the arm portion.

4. A training apparatus according to claim 1, wherein, the model arm is constructed of two parts which are combined in a manner which allows them to revolve at least partially in relation to each other around a longitudinal axis of the model arm.

5. A training apparatus for practicing the puncturing of blood vessels which comprises a model arm that includes a distal portion and a proximal portion attached to the distal portion, said distal portion including a lower arm portion and a hand portion attached to the lower arm portion; a liquid container mounted in the proximal portion, said liquid container having a flexible outer wall; a two-way pressure threshold valve positioned within the proximal portion; a first tube which is connected between the liquid container and the threshold valve; a second tube which extends from the threshold valve along said lower arm to a sealed end; and a tight-fitting cover composed of a penetrable material which covers said second tube on said lower arm; said liquid container being compressible so as to cause liquid therein to flow through said first hose into said threshold valve and from said threshold valve through said second hose to cause it to become observable through said cover.

* * * * *